(12) United States Patent
Ogawa

(10) Patent No.: US 6,563,834 B1
(45) Date of Patent: May 13, 2003

(54) NETWORK PATH CONTROLLING METHOD AND APPARATUS

(75) Inventor: Jun Ogawa, Los Angeles, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/354,598

(22) Filed: Jul. 16, 1999

(30) Foreign Application Priority Data

Jul. 31, 1998 (JP) .......................................... 10-217591

(51) Int. Cl.[7] .............................................. H04L 12/28
(52) U.S. Cl. ...................................... 370/408; 370/410
(58) Field of Search ................................ 370/238, 254, 370/256, 389, 392, 400, 410, 401, 408, 393, 394, 465, 467, 474, 475; 709/220–227, 230, 238, 241, 242, 245

(56) References Cited

U.S. PATENT DOCUMENTS

| | | | | | |
|---|---|---|---|---|---|
| 5,224,100 A | * | 6/1993 | Lee et al. | ..................... | 370/408 |
| 5,353,283 A | * | 10/1994 | Tsuchiya | ..................... | 370/392 |
| 5,497,368 A | * | 3/1996 | Reijnierse et al. | .......... | 370/351 |
| 5,583,996 A | * | 12/1996 | Tsuchiya | ..................... | 370/258 |
| 5,831,982 A | * | 11/1998 | Hummel | ..................... | 370/396 |
| 5,917,820 A | * | 6/1999 | Rekhter | ..................... | 370/392 |
| 5,949,786 A | * | 9/1999 | Bellenger | ..................... | 370/401 |
| 6,011,795 A | * | 1/2000 | Varghese et al. | ............ | 370/392 |
| 6,026,077 A | * | 2/2000 | Iwata | ..................... | 370/254 |
| 6,094,525 A | * | 7/2000 | Perlman et al. | ............. | 709/238 |
| 6,122,753 A | * | 9/2000 | Masuo et al. | ............... | 370/228 |
| 6,330,239 B1 | * | 12/2001 | Suzuki | ..................... | 370/395.1 |
| 6,333,918 B1 | * | 12/2001 | Hummel | ..................... | 370/400 |

FOREIGN PATENT DOCUMENTS

| | | |
|---|---|---|
| JP | 5-292091 | 11/1993 |
| JP | 6-120944 | 4/1994 |
| JP | 9-275403 | 10/1997 |
| JP | 9-275403 | 3/1999 |

\* cited by examiner

*Primary Examiner*—Chau Nguyen
*Assistant Examiner*—Andy Lee
(74) *Attorney, Agent, or Firm*—Katten Muchin Zavis Rosenman

(57) ABSTRACT

A network path controlling method and an apparatus therefor perform a path retrieval based on path information exchanged between routers in order that networks which share IP addresses hierarchized by arbitrarily dividing the IP addresses by an arbitrary bit length from an upper bit can be mutually connected through an upper one of hierarchized networks of the hierarchized IP addresses. Each of the routers exchanges hierarchy information of the highest hierarchized network in the hierarchized networks having the routers therebetween in the form of the path information. A source host allots and transmits the hierarchized information to an IP address of a destination host for a packet. A relaying router performs the path retrieval based on the hierarchy information.

13 Claims, 12 Drawing Sheets

NETWORK PATH CONTROLLING METHOD AND APPARATUS

BACKGROUND OF THE INVENTION

1. Field of the Invention

The present invention relates to a network path controlling method and an apparatus therefor, and in particular to a method and an apparatus for controlling a hierarchized network.

As an internet/intranet is rapidly spread in offices and campuses, former experimental networks have been transforming into networks which bear the nucleus of business. Accordingly, a hierarchized network which simplifies the management of network by simplifying the composition of network has been remarkable.

2. Description of the Related Art

1. IP Address and Notation

An IPv4 (IPversion4) address which is an IP (Internet Protocol) address generally used at present has an address length of 32 bits as shown in FIG. 10, and is notated (hierarchized or layered) by the division with '.' per an arbitrary number of e.g. 8 bits. The address is allotted to every node and is composed of two portions, i.e. a network portion indicating a network NW to which the node belongs and a host portion indicating an individual node (host) HST. Also, the bit number of an objective network portion is notated with '/' after the IP address.

In one example of address "133.160.115.5/24" shown in FIG. 10, the top 24 bits (133.160.115) of "133.160.115.5" indicate the network portion, and "5" of same indicates the host portion. In addition, the IP address whose host portion is "0" means the network itself. Namely, the network of the address "133.160.115" is notated as "133.160.115.0/24".

2. Composition of the Present IP Network

In the present IP networks, as shown in FIG. 11, when networks NW1 and NW2 are connected with a router $R_A$, networks NW2 and NW3 are connected with a router $R_B$, and networks NW2 and NW4 are connected with a router $R_C$, the network NW1 whose address is "133.160.115.0/24" and the network NW3 whose address is "133.160.116.0/24" are not adjoining with each other, and the network NW2 lies between them.

Thus, it is possible that an arbitrary network lies between the IP networks having an address according to the above-mentioned notation, and no hierarchization based on the address is considered.

3. Path Selecting Method of IPv4.

A packet has a path (route) selection directed by an router which is set up on the boundary of the networks, and path information required for the path selection is periodically exchanged between routers.

An exchange example of the path information in the prior art is shown in FIG. 12. The path information of the address "133.160.115.0/24" is exchanged from the router $R_A$ into the router $R_B$, thereby enabling the router $R_B$ to recognize the existence of the network NW1 whose address is "133.160.115.0/24" ahead of the address "150.123.212.0/24".

Likewise, the router $R_A$ recognizes that the network NW3 whose address is "133.160.116.0/24" exists ahead of the network NW2 whose address is "150.123.212.0/24" from the path information of the router $R_B$. The exchange of the path information between the router $R_C$ and the routers $R_A$ and $R_B$ is performed in the same way. Each of the routers tables this path information to be renewed at the next path exchange.

FIG. 13 shows an example of packet relay in the network where the path is exchanged in FIG. 12, which will be sequentially described as follows:

(1) An IP packet P1 having a destination address (Dst) "133.160.116.1" which has been transmitted from a host Ha to a host Hb is given to the router $R_A$ which is a router of the network NW1 whose address is "133.160.115.0/24".

(2) The router $R_A$ retrieves a path information table (a routing table) about the whole network portion (133.160.116.) of the destination address at the router $R_A$ itself. In this example, the network NW3 whose address is "133.160.116.0/24" on the router $R_B$ and the network NW4 whose address is "133.160.117.0/24" on the router $R_C$ are stored in the table.

(3) As a result of the table retrieval, the router $R_A$ recognizes that the router $R_B$ is the next destination and transfers the packet P1 to the router $R_B$.

(4) The router $R_B$ which has received the packet P1 recognizes from the network portion (133.160.116) of the packet P1 that the packet is addressed to the network NW3 which is its own subordinate, and then transfers the packet P1 to the host Hb with watching the host portion (0/24) of the packet P1.

It should be intensively noted that the path retrieval is performed about the whole of the network in the above-mentioned (2) and (4). This is because the network is not hierarchized based on the IP address so that the router $R_A$, for instance, can not determine to which router $R_B$ or $R_C$ the packet should be transmitted only with the retrieval about a part (133.160) of the network portion.

In accordance with a recent large-scaled internet/intranet, there has been increased needs of simplifying the network composition and facilitating centralized controls. For the needs, the construction of the hierarchized IP network has been remarkable.

However, there are problems for the achievement of the above-mentioned hierarchized IP network.

①A network itself has no hierarchical structure based on an IP address.

②A path control has no construction attending to hierarchization.

The former problem ① is being solved because a new version IP=IPv6 (version6) which hierarchizes the network composition itself by promoting the address hierarchization is studied by a standardizing organization. However, the latter problem ② has not yet been solved.

SUMMARY OF THE INVENTION

It is accordingly an object of the present invention to provide a network path controlling method and an apparatus therefor which performs a path retrieval based on path information exchanged between routers in order that networks which share IP addresses hierarchized by arbitrarily dividing the IP addresses by an arbitrary bit length from an upper bit can be mutually connected through an upper one of hierarchized networks of the hierarchized IP addresses in which hierarchy information can be simply exchanged by limiting an area of destination address to be referred upon the path retrieval to achieve a high-speed path retrieval.

1. Basic Concept

A path control in the hierarchized network is not required to be performed to the whole of a network of IP address but has only to be performed per each hierarchy. For example, the network shown in FIG. 1 is hierarchized based on the structure of IP address.

In this example, when a host $H_A$ on a network NW111 whose address is "α.A.a.0/24" transmits a packet P to a host $H_B$ on a network NW221 whose address is "β.B.a.0/24", it is enough to perform a path selection with paying attention only to "β" at the address of the host $H_B$ in a network NW10 whose address is "α.0.0.0.8". However, the host $H_B$ has no need to perform the path selection until the packet enters a network NW20 whose address is "β.0.0.0/8". Namely, there is always no need to perform the path retrieval for the whole of network.

In this way, by the methods of ① exchanging not only the above-mentioned path information in the prior art but also the hierarchy information, and ② allotting the hierarchy information to the destination IP address of the packet, it becomes possible to perform a path selection to a part of the destination address, that is an only adequate hierarchical position in the network portion upon the path retrieval of each router.

2. Solution Means

FIG. 1 shows a hierarchized network constructed according to the rules described hereinbelow:

① An upper hierarchy must include a lower hierarchy. In the example of FIG. 1, a network whose address is e.g. "α.B.b.0/24" can not be provided between the network NW111 whose address is "α.A.a.0/24" and a network NW112 whose address is "α.A.b.0/24".

② The networks at the same hierarchy common to the same upper hierarchy can be connected. In the example of FIG. 1, the network NW111 whose address is "α.A.a.0/24" and the network NW112 whose address is "α.A.b.0/24" can be connected.

Routers R2–R6 attending to the hierarchized networks shown in FIG. 1 perform path controls for the hierarchized networks, and perform packet relay processing based on the path controls. As shown in the example of the router R4, each router has a packet transmitting/receiving means 1 shown in FIG. 2, a path table holding means 2 shown in FIG. 3, a packet preparing means 3 shown in FIG. 4, a path information receiving means 4 shown in FIG. 5, a path information transmitting means 5 shown in FIG. 6, and a relay packet processing means 6 shown in FIG. 7. Hereinafter the term "router" will designate a router attending to the hierarchized network.

It is to be noted that the host HA on the hierarchized network can be composed with the packet transmitting/receiving means 1, the path table holding means 2, the packet preparing means 3, and the path information receiving means 4 among the above-noted router elements. Having functions included in the router attending to the hierarchized network which will be described below, those means 1–4 will not be hereinafter made distinguished from each other.

It is supposed that each of the means 1–6 each router holds can deal with hierarchized extensions as hierarchy information that is its own extension allotted to the IP address indicating the hierarchy of the address. These operations are performed by exchanging the hierarchized extensions of the highest hierarchized network in the hierarchized networks having the routers therebetween in the form of path information.

In this case, all of the hierarchized extensions in the received path information are held in the routers.

An address notation using the hierarchized extension is, e.g. "133.160.115.0/17/24". This example indicates the hierarchy from the 17th to 24th bits of "133.160.115.0", that is the hierarchy of "115". In addition, the extension "115/16/24" indicates that the hierarchy from the 17th to 24th bits is "115"

Each of the means 1–6 of the router will now be described.

2.1 Packet Transmitting/Receiving Means 1 (see FIG. 2):

This is a means for transmitting/receiving the IP packet, and comprises a packet receiver 11 and a packet transmitter 12.

The packet receiver 11: This is a so-called receiving portion of the IP packet. When the packet received from the transmission line is the path information, it is transferred to the path information receiving means 4, and otherwise is transferred to the relay packet processing means 6.

The packet transmitter 12: This is a so-called transmitting portion of the IP packet. The transmission processing is performed to the packet transferred from the path information transmitting means 5 or the relay packet processing means 6 to the transmission line.

2.2 Path Table Holding Means 2 (see FIG. 3):

This is a means for holding the path information as a table, and comprises a non-hierarchized network table portion 21 and a hierarchized network table portion 22.

The non-hierarchized network table portion 21: This is a conventional table portion holding the path information to the non-hierarchized network.

The hierarchized network table portion 22: This is a table holding the path information to the hierarchized network.

2.3 Packet Preparing Means 3 (see FIG. 4):

This is a means for preparing/transmitting the packet in the own router/host serving as a transmitting source according to a demand from the upper hierarchy, and comprises a packet preparing portion 31 and a path retrieval portion 32.

The packet preparing portion 31: This is a portion for preparing the packet which the own node transmits, and has following functions;

① The packet preparing portion 31 prepares the IP packet according to the instructions from the upper hierarchy;

② The packet preparing portion 31 instructs the path retrieval portion 32 of the path retrieval for the packet destination address to allot the hierarchized extension based on the retrieval result if the destination is the hierarchized network;

③ The packet preparing portion 31 requests the packet transmitting/receiving means 1 to transmit the packet.

The path retrieval portion 32: This portion has a function of performing the path retrieval for the destination address instructed by the packet preparing portion 31 with the path table holding means 2. It is to be noted that the hierarchized extension is transferred to the packet preparing portion 31 together with the retrieval result if the retrieval result exists in the hierarchized network table portion 22.

2.4 Path Information Receiving Means 4 (see FIG. 5):

This is a means for preparing the path table based on the path information received from an adjoining router, and comprises a hierarchized network-path information extractor 41, a non-hierarchized network table constructor 42, and a hierarchized network table constructor 43.

The hierarchized network-path information extractor 41: This portion classifies entries in the path information transferred from the packet transmitting/receiving means 1 into ones of the hierarchized network or of non-hierarchized network respectively based on the presence or absence of the hierarchized extension.

The non-hierarchized network table constructor 42: This portion is a conventional path table constructor for writing entries in the path information addressed to the non-hierarchized network extracted by the hierarchized network-path information extractor 41 in the non-hierarchized network table portion 21 of the path table holding means 2.

The hierarchized network table constructor 43: This portion only extracts a hierarchy forming a retrieval object in the own router/host from the path information entries addressed to the hierarchized network extracted by the hierarchized network-path information extractor 41 to write the same in the hierarchized network table portion 22 of the path table holding means 2.

2.5 Path Information Transmitting Means 5 (see FIG. 6):

This is a means for transmitting the path information to the adjoining router or the host, and comprises a timer portion 51, a hierarchy instructor 52, and a transmitting path information preparing portion 53.

The timer portion 51: This is a conventional timer portion having a function of instructing the transmitting path information preparing portion 53 of the destination of the path information at a fixed time interval.

The hierarchy instructor 52: This has a function of notifying the transmitting path information preparing portion 53 of the hierarchy of the adjoining network to which the path information is transmitted. It is supposed that the hierarchy instructor 52 has already known the hierarchy of the adjoining network by a user's designation or a certain means which is not described here.

The transmitting path information preparing portion 53: This portion has functions of preparing the path information by the combination of the non-hierarchized network table portion 21 and the hierarchized network table portion 22, and of transmitting the path information to the adjoining router or host via the packet transmitting/receiving means 1.

Preparing the path information by the non-hierarchized network table portion 21 is performed in the same way as the prior art. The hierarchized network table portion 22 prepares the hierarchization path information based on the instructions from the hierarchy instructor 52.

2.6 Relay Packet Processing Means 6 (see FIG. 7):

This is a means for performing the relay processing to the packet received from the packet transmitting/receiving means 1, and comprises a selector for packet addressed to hierarchization attending network 61, a packet path controller 62 addressed to the non-hierarchized network, a path table retrieval portion 63 addressed to the non-hierarchized network, a packet path controller 64 addressed to the hierarchized network, a specified hierarchy path table retrieval portion 65, an unspecified hierarchy path table retrieval portion 66, and an in-homonetwork packet transfer portion 67.

The packet selector 61: This portion has functions of determining whether or not the destination is the hierarchized network based on the existence of the hierarchized extension of the packet transferred from the packet transmitting/receiving means 1, of transferring the packet to the packet path controller 64 in case of the hierarchized network, and of transferring the packet to the packet path controller 62 in case of the non-hierarchized network.

In addition, if the bits lower than the hierarchized extension in the network portion of the destination IP address is consistent with the IP address of the network itself to which the router itself belongs, the destination host is judged to be in the network to which the router belongs, and the relaying packet is transferred to the in-homonetwork packet transfer portion 67 to deliver the packet to the destination host itself.

The packet path controller 62: This portion is a conventional path controller for instructing the path table retrieval portion 63 of the retrieval of the path table to the network portion of the packet destination address, and for transmitting the packet to the router recognized as performing a next relay processing from the retrieval result through the packet transmitting/receiving means 1.

The path table retrieval portion 63: This is a conventional path table retrieval portion for retrieving the router which is to transmit the packet next from the whole of the network portion of the packet destination address based on the non-hierarchized network table portion 21 of the path table holding means 2, and for notifying the packet path controller 62 of the retrieval result.

The packet path controller 64: This portion is a path controller for the packet addressed to the hierarchized network, which has the following functions:

① When the hierarchized extension is allotted to the destination address and the destination address at the hierarchy indicated by the hierarchized extension is different from the address at the same hierarchy of the router which performs the relay processing, the controller determines that the packet has not reached the network of the hierarchy indicated by the hierarchized extension. In this case, the controller instructs the specified hierarchy packet path table retrieval portion of the path retrieval and performs the transmission processing based on the retrieval result;

② In other cases, that is when the hierarchized extension is allotted to the destination address and the destination IP address at the hierarchy indicated by the hierarchized extension indicates the address at the same hierarchy of the router which is performing the relay processing, the following process is performed.

This controller determines that the packet has reached the network of the hierarchy indicated by the hierarchized extension, and instructs the unspecified hierarchy path table retrieval portion 65 to perform the path retrieval about bits lower than the hierarchized extension in the network portion of the destination IP address, and resultantly rewrites the hierarchy information notified from the unspecified hierarchy path table retrieval portion 66 to a new hierarchized extension to perform the transmission processing.

The specified hierarchy path table retrieval portion 65: This portion has functions of retrieving the path table of an area indicated by the hierarchized extension in the destination IP address with respect to the hierarchized network table portion 22 in the path table holding means 2 based on the instructions of the packet path controller 64, and of notifying the packet path controller 64 of the retrieval result.

The unspecified hierarchy path table retrieval portion 66: This portion has functions of retrieving the path table about bits lower than the hierarchized extension in the network portion of the destination IP address with respect to the hierarchized network table portion 22 of the path table holding means 2 based on the instructions of the packet path controller 64, and of notifying the packet path controller 64 of the retrieval result.

The in-homonetwork packet transfer portion 67: This is a portion of transferring the packet to the host which is in the same network as the router, which has functions of removing the hierarchized extension from the destination IP address of the packet, and of transferring the packet to the host itself which is a destination by a conventional homonetwork-transmitting means such as ARP (Address Resolution Protocol).

3. Communication Procedure 3.1 Path Information Reception (1) The packet receiver 11 of the packet transmitting/receiving means 1 which has received a path information-exchanging packet determines that it is a packet of path information and transfers the same to the path information receiving means 4.

(2) In the hierarchized network-path information extractor 41 in the path information receiving means 4, the entries of the path information are classified depending on whether or not they are intended for the hierarchized network according to the existence of the hierarchized extension in the entries. The entries which have the hierarchized extension are transferred to the hierarchized network table constructor 43 while the entries which have no hierarchized extension are transferred to the non-hierarchized network table constructor 42.

(3) The hierarchized network table constructor 43 prepares a path table for address information of hierarchy indicated by the hierarchized extension and writes the path table in the hierarchized network table portion 22.

(4) The non-hierarchized network table constructor 42 prepares a path table which attends to no hierarchization by using the prior art and writes the path table in the non-hierarchized network table portion 21.

Thus, the path retrieval table is prepared for the path information with respect to both of the hierarchized network and the non-hierarchized network.

3.2 Path Information Transmission (1) The timer portion 51 in the path information transmitting means 5 notifies the transmitting path information preparing portion 53 of the adjoining network to which the path information is to be transmitted.

(2) The transmitting path information preparing portion 53 prepares the path information from the non-hierarchized network table portion 21 and the hierarchized network table portion 22 as follows:

① This portion prepares the entries of path information from the hierarchized network table portion 22 for hierarchies upper than the adjoining network to which the path information is to be transmitted. At this time, the hierarchized extensions are allotted to the entries in order to clarify objective hierarchies. It is to be noted that the hierarchy of the adjoining network has preliminarily been notified by the hierarchy instructor 52;

② This portion prepares the entries of the path information from the non-hierarchized network table portion 21 by using the prior art.

(3) The transmitting path information preparing portion 53 prepares a path exchange packet including the entries prepared in the above mentioned item (2) and transmits the packet to the adjoining network instructed by the timer portion 51 in the above item ① via the packet transmitting/receiving means 1.

3.3 Packet Relay Processing (1) The packet receiver 11 in the packet transmitting/receiving means 1 which has received a packet except the path information-exchanging packet determines that the packet is to be relayed and transfers the same to the relay packet processing means 6.

(2) The packet selector 61 of the relay packet processing means 6 determines that the destination of the packet is intended for the hierarchized network depending on whether or not the hierarchized extension is allotted to the destination IP address of the packet. The packet having the hierarchized extension is transferred to the packet path controller 64 while the packet having no hierarchized extension is transferred to the packet path controller 62. The subsequent processings are divided into three parts as follows:

(a) Relay Processing of Packet Addressed to the Non-hierarchized Network.

i. The packet path controller 62 requests the path table retrieval portion 63 to perform the path retrieval about the destination address of the packet.

ii. The path table retrieval portion 63 retrieves the router to which the packet is to be transmitted next from the non-hierarchized network table portion 21 to instruct the packet path controller 62 of the retrieval result.

iii. The packet path controller 62 transmits the packet to the router which is determined as the retrieval result via the packet transmitting/receiving means 1.

(b) Relay Processing of the Packet Addressed to the Hierarchized Network (Processing Addressed to the Same or an Upper Hierarchy)

i. The packet path controller 64 compares the destination address at the hierarchy indicated by the hierarchized extension allotted to the packet with the address at the same hierarchy of the router itself which is performing the relay processing. When these addresses are different, the hierarchized extension as well as a part of the destination address indicated by the hierarchized extension are transferred to the specified hierarchy path table retrieval portion 65.

ii. The specified hierarchy path table retrieval portion 65 retrieves the router to which the packet is to be transmitted next based on only the address of the hierarchy indicated by the hierarchized extension from the hierarchized network table portion 22 to notify the packet path controller 64 of the result.

iii. The packet path controller 64 transmits this packet to the router which is determined as the retrieval result via the packet transmitting/receiving means 1.

iv. It is to be noted that the hierarchized extension allotted to the packet is not changed in this processing.

(c) Relay Processing of the Packet Addressed to the Hierarchized Network (Processing Addressed to a Lower Hierarchy)

i. The packet path controller 64 compares the destination address indicated by the hierarchized extension allotted to the packet with the address at the same hierarchy of the router itself which is performing the relay processing.

When these addresses have the same value and bits lower than the hierarchized extension in the network portion of the destination IP address do not indicate the IP address of the network itself to which the router itself belongs, it means that the packet has reached the same hierarchy as the destination address in the hierarchy indicated by the hierarchized extension of the packet itself but that the packet has not reached the network to which the destination host belongs. For this reason, this controller instructs the unspecified hierarchy path table retrieval portion 66 to perform the path retrieval for the bits lower than the hierarchized extension in the network portion of the destination IP address.

ii. The unspecified hierarchy path table retrieval portion 66 retrieves the router which the packet is to be transmitted next based on the address transferred by the packet path controller 64 from the hierarchized network table portion 22 to notify the packet path controller 64 of the retrieval result.

It is to be noted that the hierarchized extension written in the entry of the hierarchized network table portion 22 is also notified.

iii. The packet path controller 64 rewrites the hierarchized extension allotted to the packet into the one notified from the unspecified hierarchy path table retrieval portion 66, and further transmits this packet to the router which is determined as the retrieval result via the packet transmitting/receiving means 1.

(d) Relay Processing of the Packet Addressed to the Hierarchized Network (Transfer Processing Addressed to the Host in the Same Network)

i. The packet path controller 64 compares the destination address at the hierarchy indicated by the hierarchized extension allotted to the packet with the address at the same hierarchy of the router itself which is performing the relay processing.

When the addresses have the same value and the bits lower than the hierarchized extension in the network portion of the destination IP address indicate the IP address of the network itself to which the router itself belongs, it means that the packet has reached the router of the network to which the destination host belongs. For this reason, this controller transfers the packet to the in-homonetwork packet transfer portion 67.

ii. The in-homonetwork packet transfer portion 67 removes the hierarchized extension allotted to the packet and transfers the packet to the host itself which is the destination by using a conventional in-homonetwork transmitting means such as the ARP (Address Resolution Protocol).

3.4 Packet Transmission Processing (1) The transmission processing of the packet by the router itself as the transmitting source according to the demand from the upper hierarchy will now be described. The packet preparing portion 31 in the packet preparing means 3 prepares the IP packet based on the instructions from the upper hierarchy to instruct the path retrieval portion 32 to perform the path retrieval for the destination address instructed by the upper hierarchy.

(2) The path retrieval portion 32 performs the path retrieval for the destination address instructed by the destination packet preparing portion 31 by using the path table holding means 2. When the retrieval result reveals the entries of the hierarchized network table portion 22, the address of the router to which the packet is to be sent next as the retrieval result and the hierarchized extension the entry has are transferred to the packet preparing portion 31.

(3) When finding according to the response from the path retrieval portion 32 that the destination is the hierarchized network, the packet preparing portion 31 allots the hierarchized extension to the destination address portion of the IP packet based on the retrieval result and transmits the packet to the router which is determined as the retrieval result via the packet transmitting/receiving means 1.

(4) When the destination is the non-hierarchized network, the hierarchized extension is not allotted as usual, and the packet is transmitted to the router which is determined as the retrieval result via the packet transmitting/receiving means 1.

As mentioned above, the IP network hierarchically constructed based on the hierarchized address according to the present invention can achieve the hierarchized path control for a part of the destination address by introducing the hierarchized extension upon the path exchange time and the packet relaying time.

BRIEF DESCRIPTION OF THE DRAWINGS

Throughout the figures, like reference numerals indicate like or corresponding components.

DESCRIPTION OF THE EMBODIMENTS

An embodiment of a network path controlling method and an apparatus therefor according to the present invention will now be described. This embodiment is divided into an exchange example of path information and a packet relaying example based on the exchanged path information. It is to be noted that the network used in the embodiment has the following composition:

① An IP address is hierarchized into three every 8 bits from the top. Namely, they are a hierarchy of /1/8, a hierarchy of /9/16, and a hierarchy of /17/24, which are hierarchized in conformity with the rule of the above-mentioned extension;

② For instance, addresses "202.33.10.0/24" and "202.33.95.0/24" denote networks which are not hierarchized and are respectively connected to hierarchized networks. It is supposed that routers in the hierarchized networks have known addresses of non-hierarchized networks.

1. Exchange of Path Information

Figure 1:
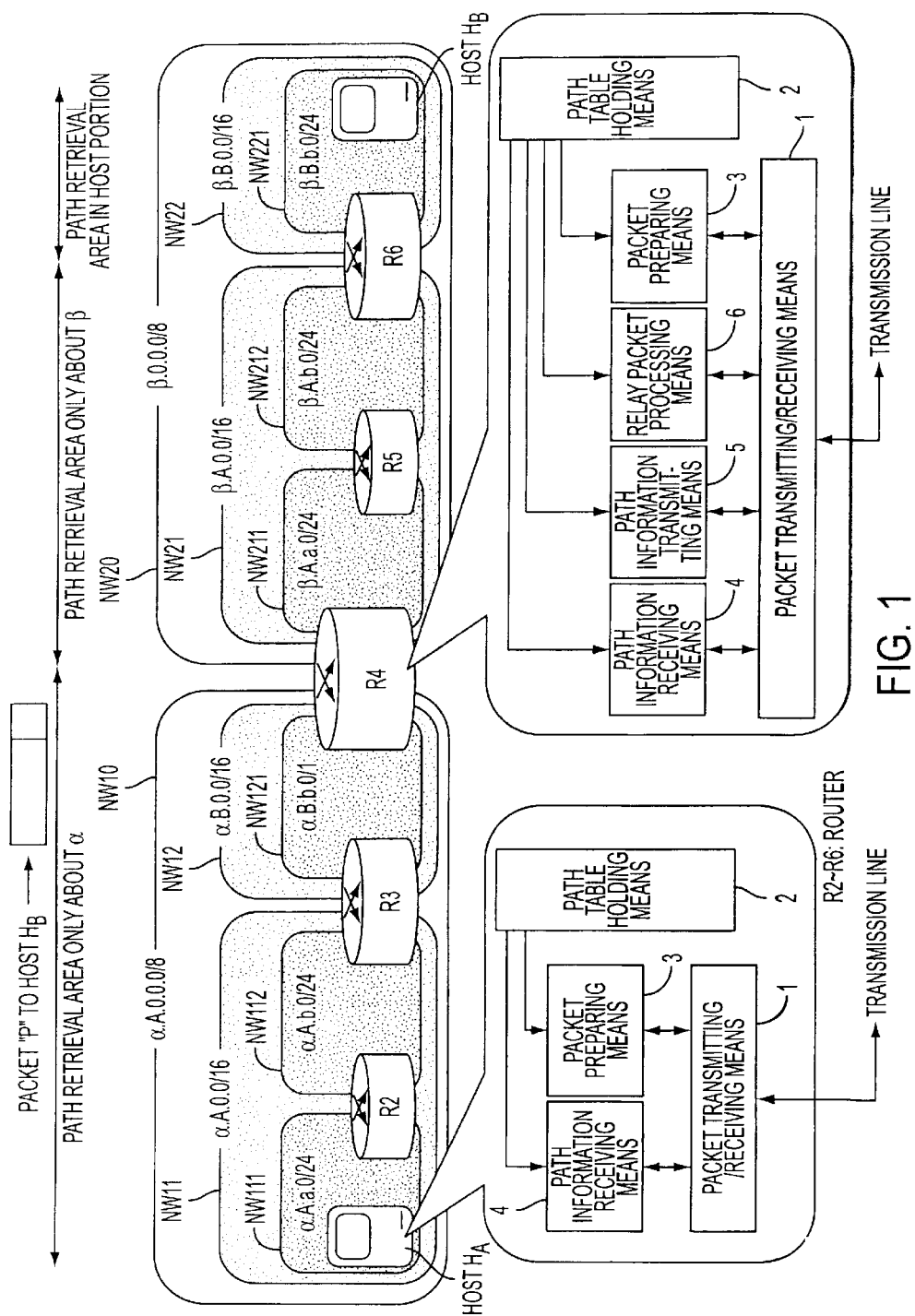
FIG. 1 is a block diagram showing a basic principle of a network path controlling method and an apparatus therefor according to the present invention.
Figure 2:
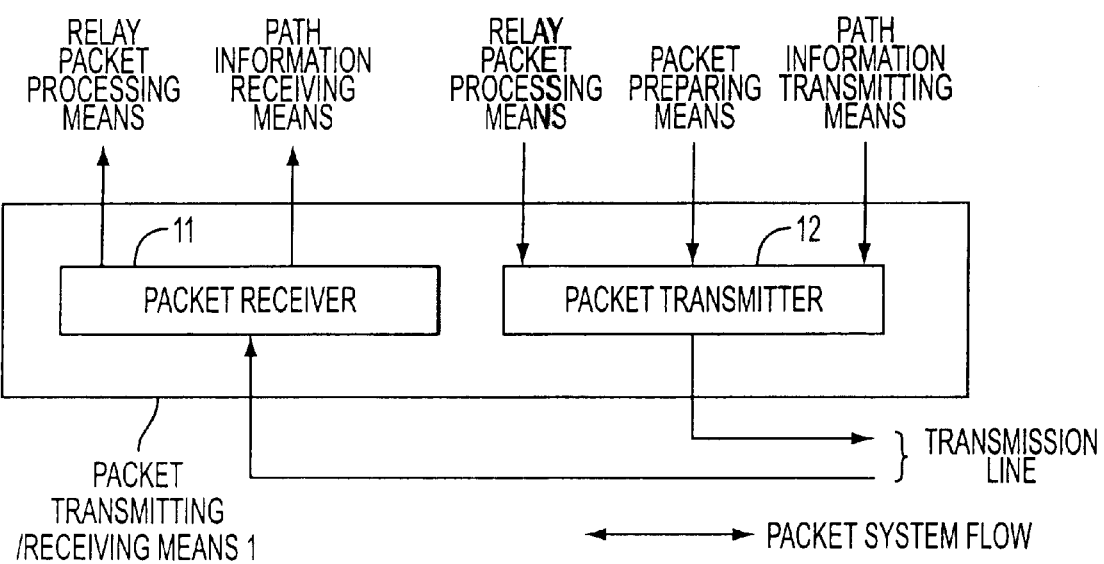
FIG. 2 is a block diagram showing an arrangement of a packet transmitting/receiving means which composes a router used in a network path controlling method and an apparatus therefor according to the present invention.
Figure 3:
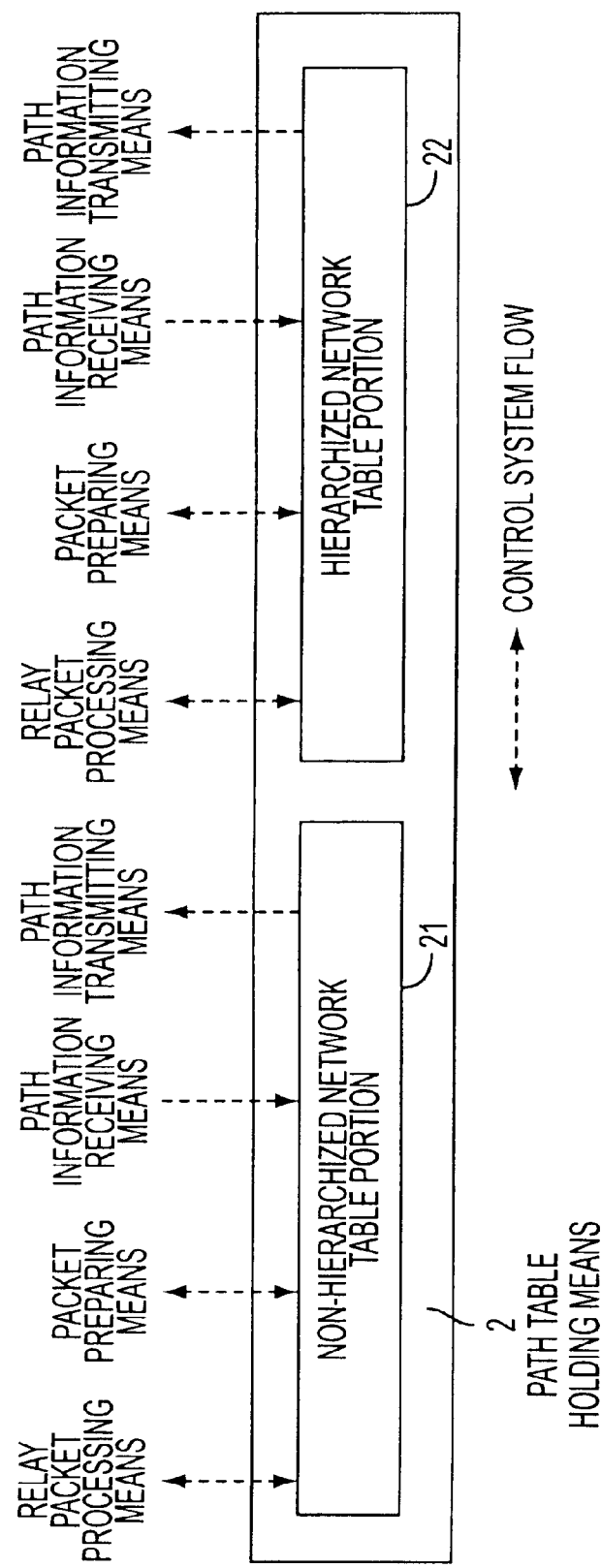
FIG. 3 is a block diagram showing an arrangement of a path table holding means which composes a router used in a network path controlling method and an apparatus therefor according to the present invention.
Figure 4:
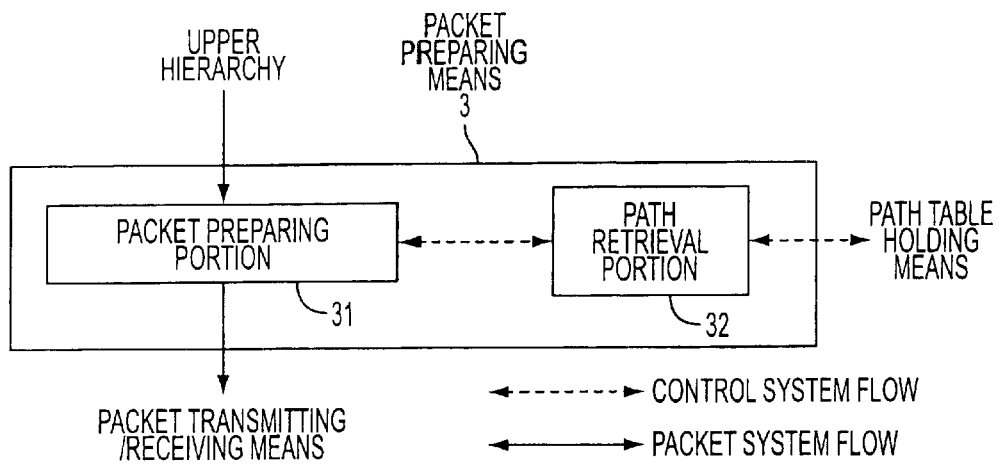
FIG. 4 is block diagram showing an arrangement of a packet preparing means which composes a router used in a network path controlling method and an apparatus therefor according to the present invention.
Figure 5:
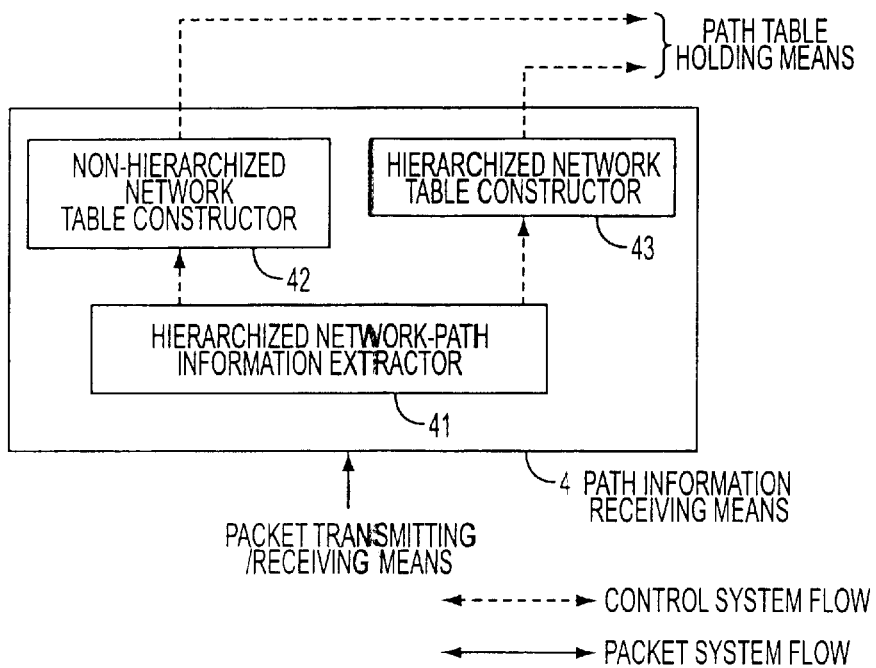
FIG. 5 is a block diagram showing an arrangement of a path information receiving means which composes a router used in a network path controlling method and an apparatus therefor according to the present invention.
Figure 6:
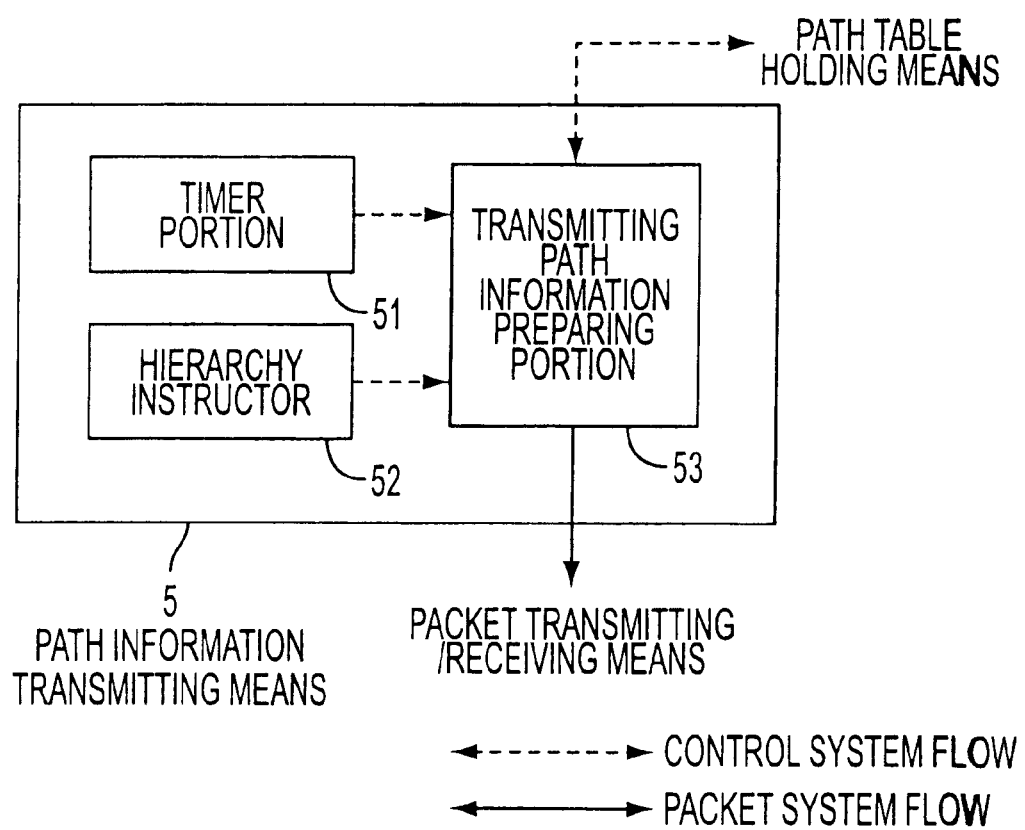
FIG. 6 is a block diagram showing an arrangement of a path information transmitting means which composes a router used in a network path controlling method and an apparatus therefor according to the present invention.
Figure 7:
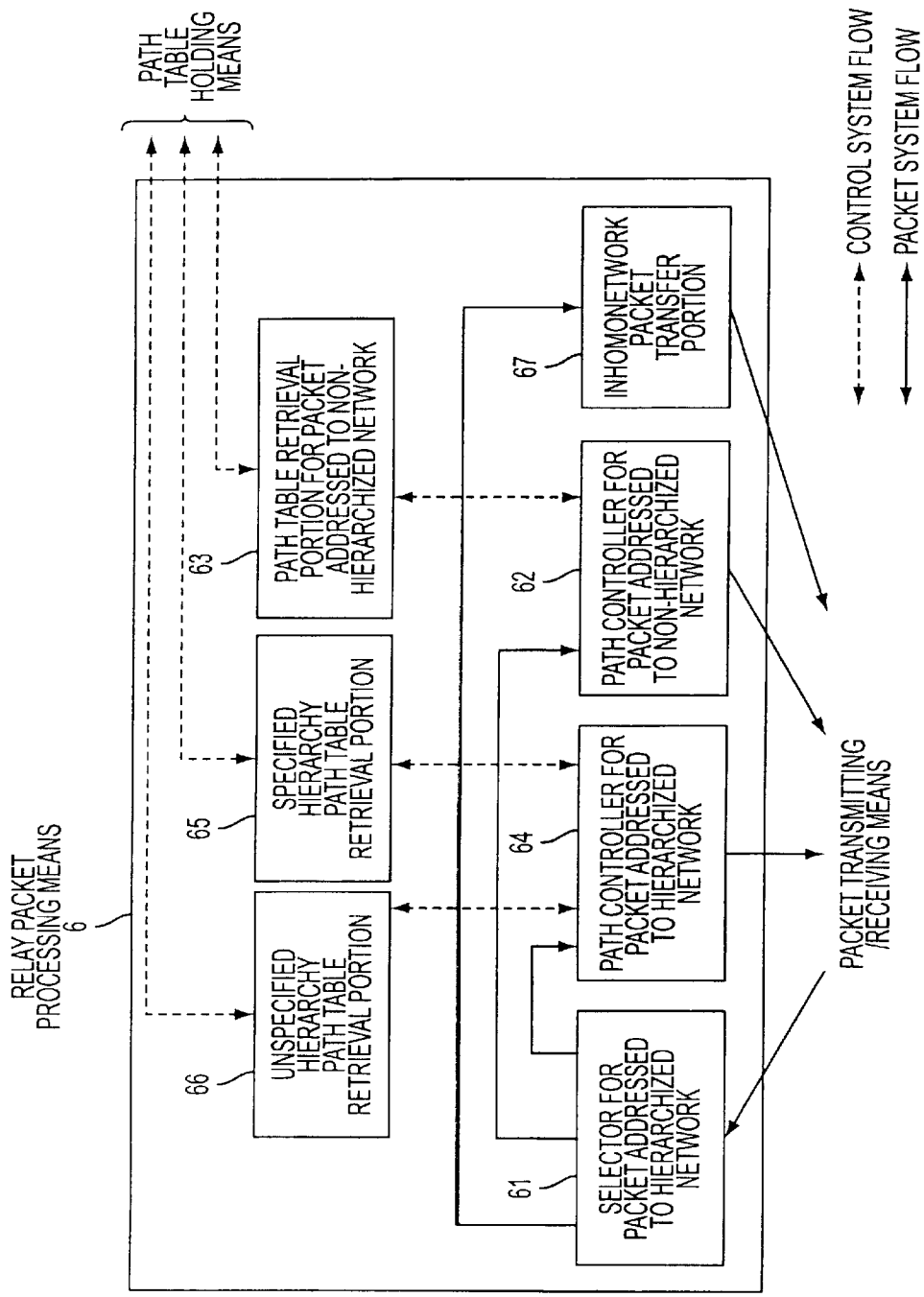
FIG. 7 is a block diagrams showing an arrangement of a relay packet processing means which composes a router used in a network path controlling method and an apparatus therefor according to the present invention.
Figure 8:
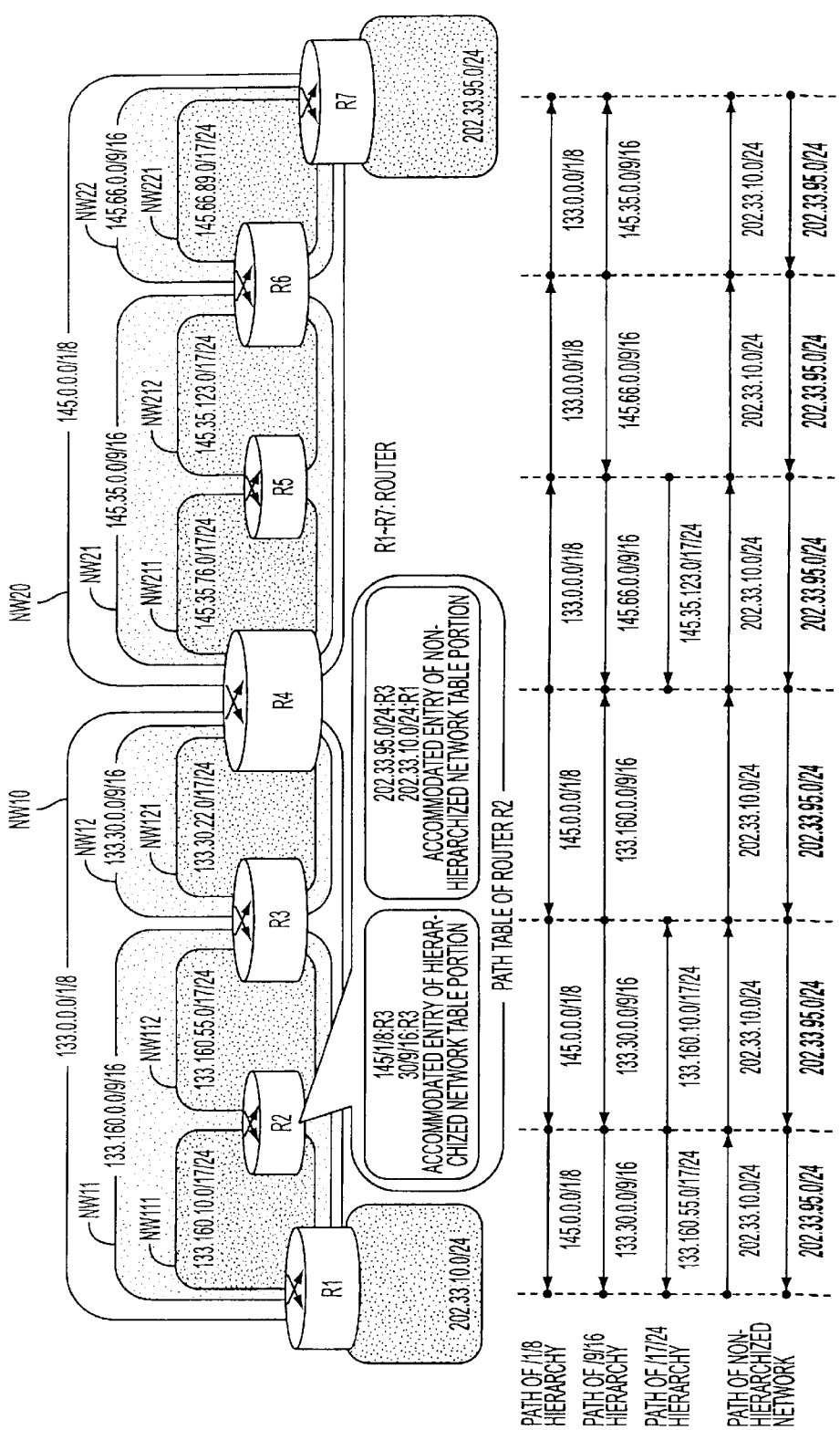
FIG. 8 is a diagram showing an embodiment of a path information exchange which utilize a network path controlling method and an apparatus therefor according to the present invention.

FIG. 8 shows an exchange example of path information transferred via the arrangement shown in FIG. 1 according to the present invention. It is to be noted that routers R1 and R7 are substituted for the hosts $H_A$ and $H_B$. The arrows shown in the lower part of FIG. 8 indicate the path information exchanged between the routers R1–R7. For instance, the router R2 receives, from the router R3, a couple of hierarchized path information of addresses "145.0.0.0/1/8"

and "133.30.0.0/9/16" which belong to a top hierarchy among networked address hierarchies and a single non-hierarchized path information of an address "202.33.95.0/24". The router R2 transmits, to the router R3, a single hierarchized path information of an address "133.160.10.0/17/24" and a single non-hierarchized path information of address "202.33.10.0/24".

An exchange example of the path information between the routers R2, R3, and R4 will now be described;

(1) Reception of Path Information in Router R2

(a) The router R2 receives a path information packet (not shown) from the router R1. The hierarchized network-path information extractor 41 in the path information receiving means 4 detects an entry "202.33.10.0/24" from the packet, and determines that the path information is directed to a non-hierarchized network because the entry has no hierarchized extension. Then the hierarchized network path information extractor 41 instructs the non-hierarchized network table constructor 42 to write the entry in a non-hierarchized network table portion in the path table holding means 2.

(b) The router R2 receives the path information packet from the outer R3. The hierarchized network-path information extractor 41 in the path information receiving means 4 determines that the path information is directed to a non-hierarchized network because the entry "202.33.95.0/24" of the packet has no hierarchized extension to write the entry in the non-hierarchized network table portion 21 via the non-hierarchized network table constructor 42.

On the other hand, the hierarchized network-path information extractor 41 determines that since two entries "145.0.0.0/1/8" and "133.30.0.0/9/16" of the packet have hierarchized extensions the path information is directed to the hierarchized network to instruct the hierarchized network table constructor 43 in the path table holding means 2 to write the entries in the hierarchized network table portion 22. The hierarchized network table constructor 43 writes only the portions indicated by the hierarchized extensions, i.e. "145/1/8/" and "30/9/16" in the hierarchized network table portion 22.

(c) A path table of the router R2 is thus completed. This table is renewed by the next path exchange via the routers R1, R2, and R3.

(2) Transmission of Path Information in Router R2

(a) The timer portion 51 in the path information transmitting means 5 of the router R2 instructs the transmitting path information preparing portion 53 of transmitting the path information to the router R3.

(b) The path information about the entries prepared with the path information from the routers except the router R3 in the path table of the router R2 and about a network NW111 (133.160.10.0) not shared by the routers R2 and R3 is prepared and transmitted. Namely, a path information packet including two entries "133.160.10.0/17/24" and "202.33.10.0/24" is transmitted to the router R3.

(c) In the same way, the router R2 periodically transmits the path information to the router R1.

(3) Reception of Path Information in Router R3

In the same procedure as the router R2, the router R3 receives the path information from the routers R2 and R4 to prepare the path table.

(4) Transmission of Path Information in Router R3

(a) The timer portion 51 in the path information transmitting means 5 of the router R3 instructs the transmitting path information preparing portion 53 of transmitting the path information to the router R4.

(b) The entries prepared with the path information from the routers except the router R4 in the path table of the router R3 and a network NW 112 (133.160.55.0) not shared by the routers R2 and R3, namely three entries "133.160.10.0/17/24", "133.160.55.0/17/24", and "202.33.10.0/24" are objects of the path information which is to be transmitted to the router R4.

However, since the transmitting path information preparing portion 53 has already known that the router R3 itself is a boundary router between "133.160.0.0/9/16" and "133.30.0.0/9/16", i.e. a boundary router of hierarchy "/9/16" by a notification from the hierarchy instructor 52, the "133.160.10.0/17/24" and "133.160.55.0/17/24" are combined to "133.160.0.0/9/16".

Namely, the change of hierarchization in the path information is executed in the transmitting path information preparing portion 53, and the path information including two entries "133.160.0.0/9/16" and "202.33.10.0/24" is transmitted to the router R4.

(c) The transmission of the path information from the router R3 to the router R2 is executed in the same way, and "133.30.22.0/17/24" is transmitted as "133.30.0.0/9/16" together with the entries (145.0.0.0/1/8 and 202.33.95.0/24) via the router R4.

(5) Reception of Path Information in Router R4

In the same procedure as the router R2, the router R4 receives the path information from the routers R3 and R5 to prepare the path table.

(6) Transmission of Path Information in Router R4

(a) In the same procedure as the router R3, the router R4 transmits the path information. It is to be noted that since the router R4 is a boundary router of hierarchy "/1/8", "145.0.0.0/1/8" and "133.0.0.0/1/8" are transmitted to the routers R3 and R5 respectively as the path information in addition to the entries to the hierarchized network.

2. Relay Operation of Packet 2.1 Packet Relaying to Hierarchized Network

Figure 9:
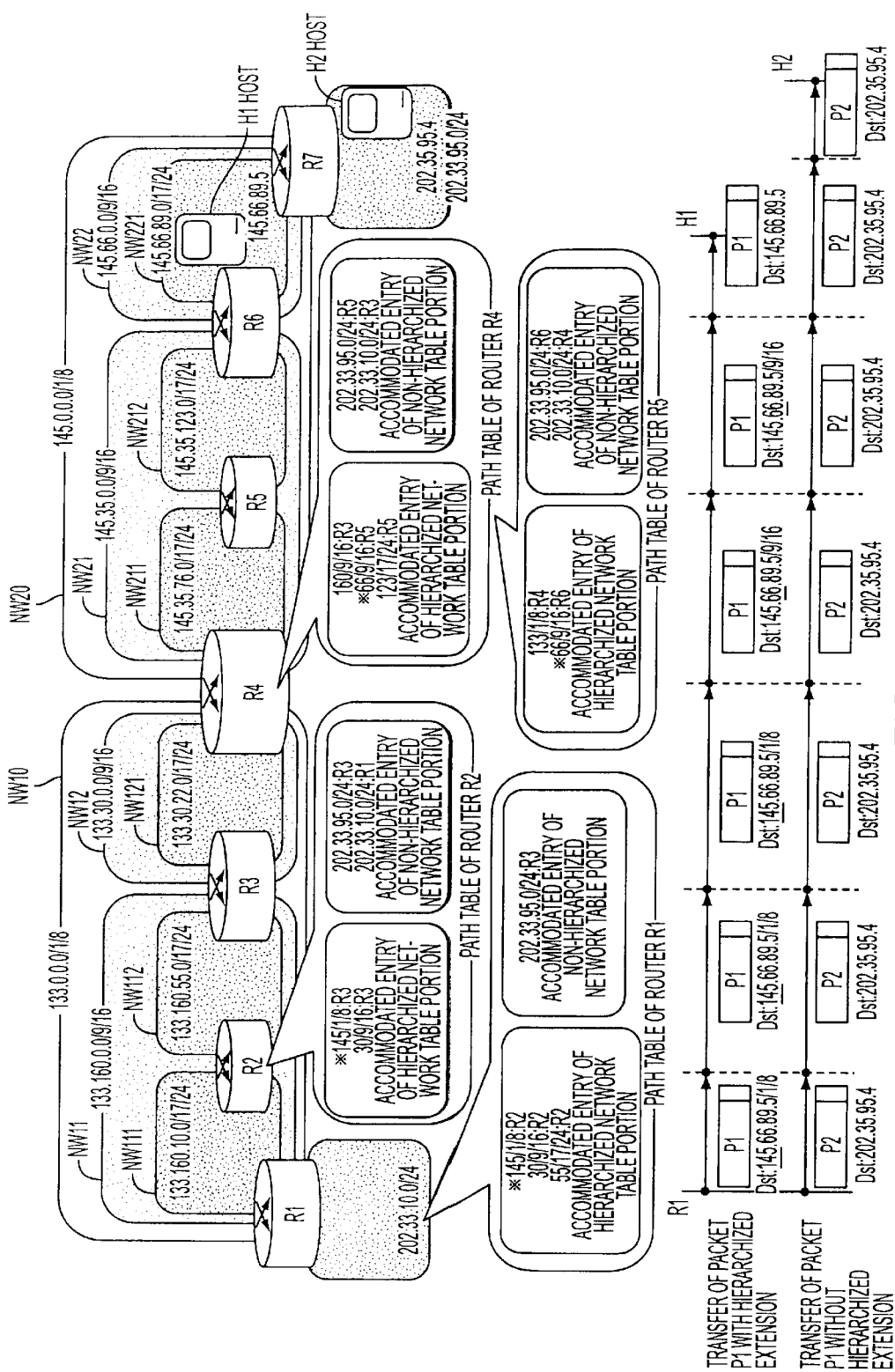
FIG. 9 is a diagrams showing an embodiment of a packet relaying which uses a network path controlling method and an apparatus therefor according to the present invention.
Figure 10:
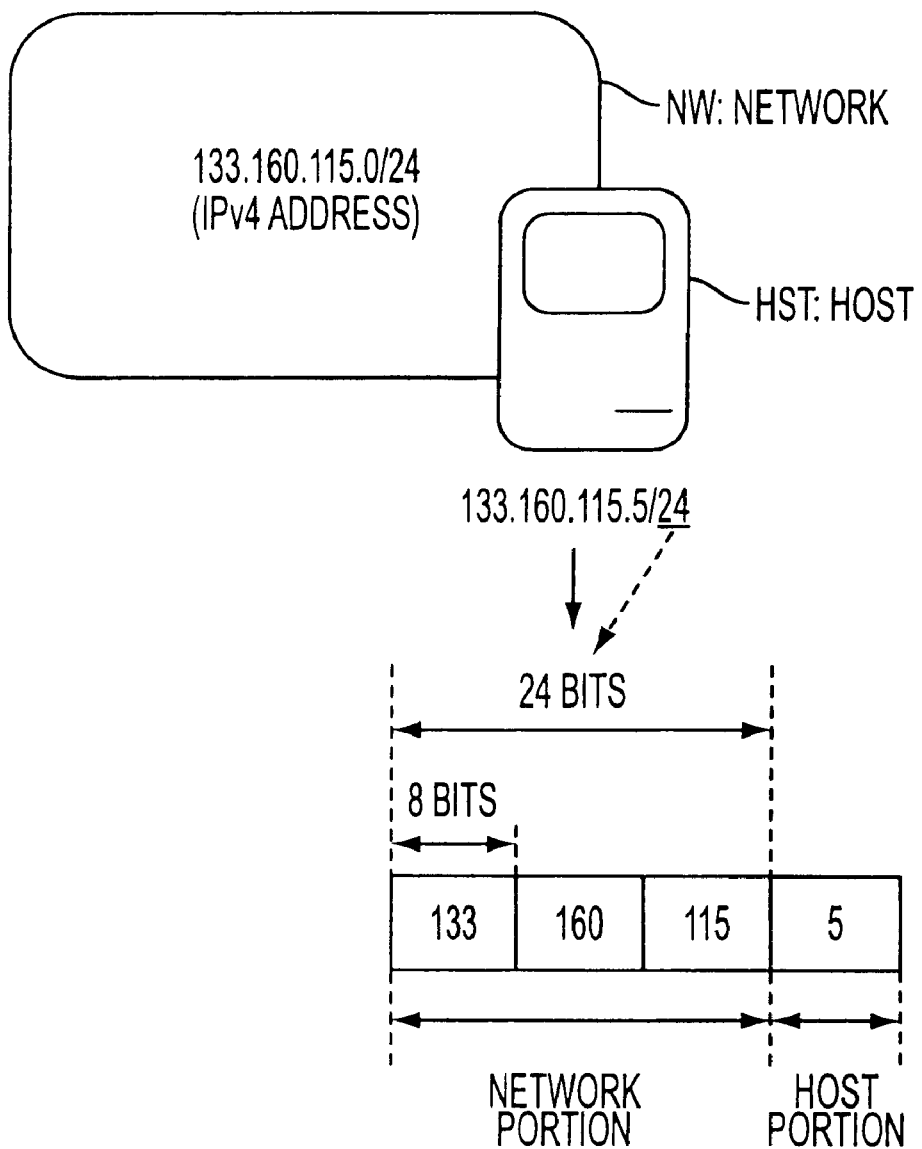
FIG. 10 is a diagram showing a structure of a conventional IPv4 address.
Figure 11:
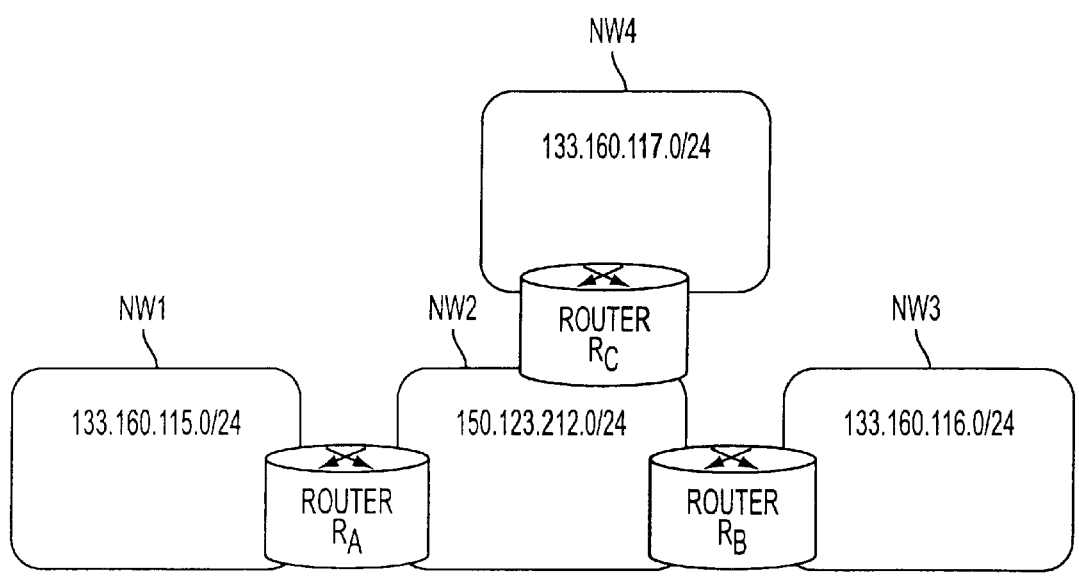
FIG. 11 is an outlined diagram showing an arrangement of a conventional non-hierarchized IP network.
Figure 12:
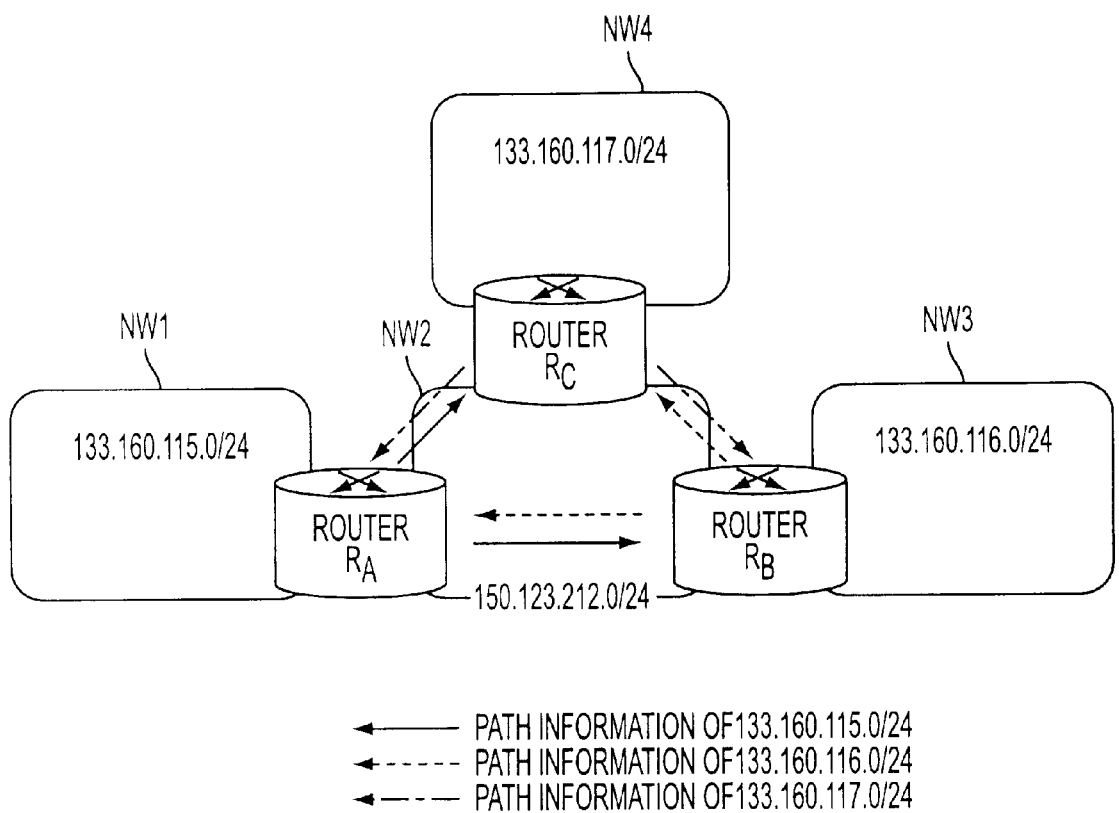
FIG. 12 is an outlined diagram showing an example of a conventional path exchange.
Figure 13:
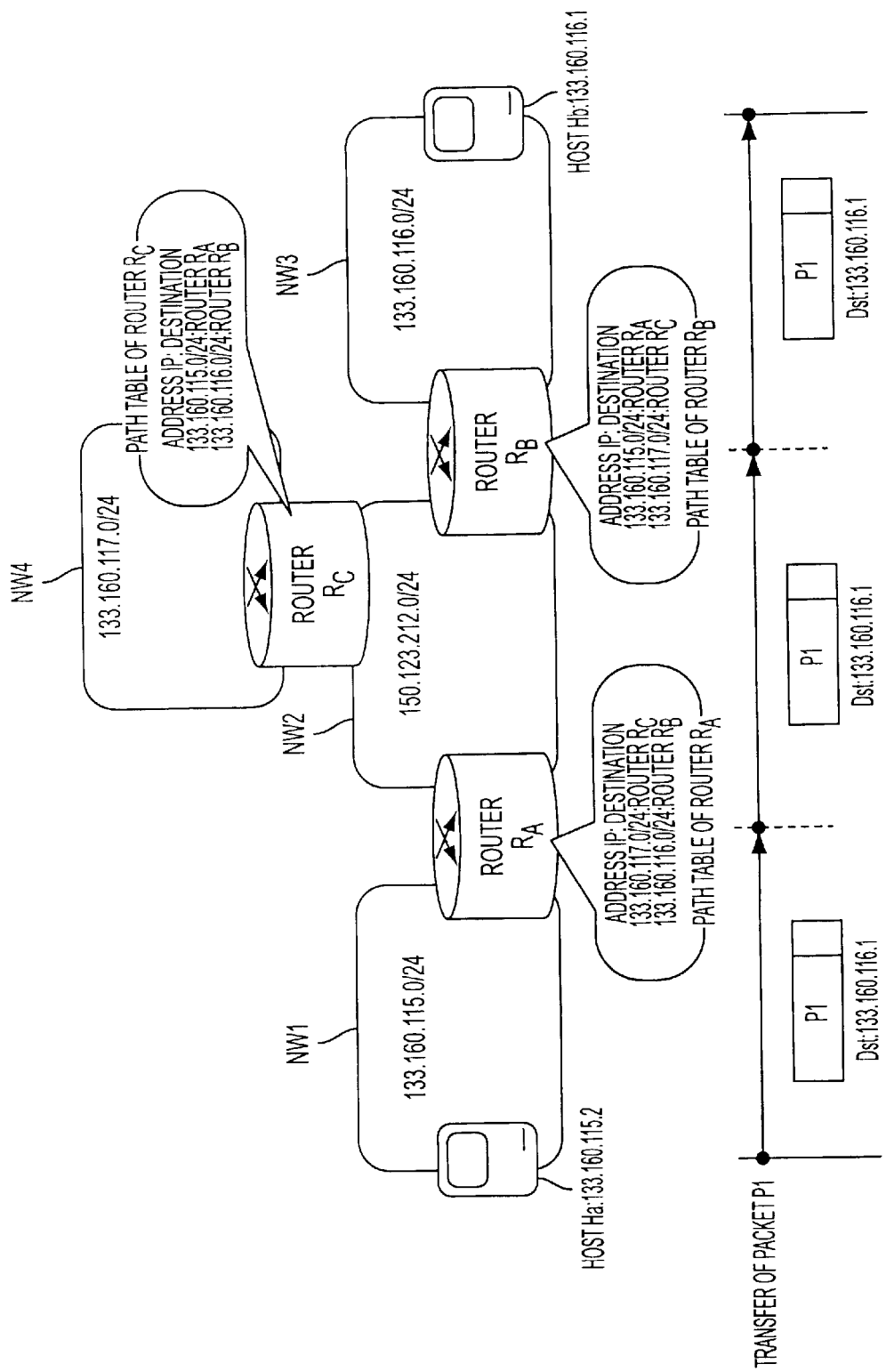
FIG. 13 is an outlined diagram showing an example of a conventional packet transfer.

In the exchange network where the path information is exchanged as shown in FIG. 8, the packet transmission to the hierarchized network, that is the transmission/relay of a packet P1 from the router R1 to a host H1 (145.66.89.5) is illustrated in FIG. 9. It is to be noted that although the following description will refer to the packet transmission from the router R1 to the host H1 as an example, the packet transmission from any host or router as well as the packet reception from any host or router can be performed likewise.

(1) Packet Transmission in Router R1

(a) By instructions from an upper hierarchy, the packet preparing portion 31 in the packet preparing means 3 of the router R1 prepares the packet P1 addressed to the H1 to instruct the path retrieval portion 32 to perform a path retrieval for "145.66.89.5".

(b) The path retrieval portion 32 firstly retrieves the hierarchized network table portion 22, and notifies the packet preparing portion 31 that the next relaying router is the router R2 and the hierarchy is "/1/8" by the fact that the packet P1 agrees with "145/1/8"

(c) The packet preparing portion 31 allots the hierarchized extension "/1/8" to the destination address at the packet P1 based on the response from the path retrieval portion 32 to transmit the packet P1 to the router R2.

(2) Relay Operation in Router R2

(a) The relay packet processing means 6 in the relaying router R2 of the router R2 receives the packet P1 via the packet transmitting/receiving means 1. The packet selector 61 determines that the packet P1 is addressed to the hierarchized network because of the fact that the hierarchized extension is allotted to the packet P1. The packet P1 is then transferred to the packet path controller 64.

(b) The packet path controller 64 instructs the specified hierarchy path table retrieval portion 65 to perform a path retrieval for "145/1/8" because the destination address value "145" indicated by the hierarchized extension is different from the address value "133" at the same hierarchy of the router R2 itself.

(c) The specified hierarchy path table retrieval portion 65 performs the path retrieval for "145/1/8" of the hierarchized network table portion 22 in the path table holding means 2, and notifies the packet path controller 64 that the next relaying router is the router R3.

(d) The packet path controller 64 transmits the packet P1 to the router R3 via the packet transmitting/receiving means 1.

(3) Relay Operation in Router R3

By the same processing as the relay processing in the router R2, the packet P1 is transmitted to the router R4

(4) Relay Operation in Router R4

(a) The relay packet processing means 6 of the router R4 receives the packet P1 via the packet transmitting/receiving means 1, and the packet selector 61 determines that the packet P1 is addressed to the hierarchized network because the hierarchized extension is allotted to the packet P1 to transfer the packet P1 to the packet path controller 64.

(b) Since the destination address value "145" of the hierarchy indicated by the hierarchized extension is the same as the address value "145" at the same hierarchy of the router R2 itself, the packet path controller 64 instructs the unspecified hierarchy path table retrieval portion 66 to perform the path retrieval for the whole of the address "66.89.5/9/32" lower in hierarchy than "145".

(c) The unspecified hierarchy path table retrieval portion 66 performs the path retrieval for "66.89.5/9/32" of the hierarchized network table portion 22 in the path table holding means 2, and notifies the packet path controller 64 that the next relaying router is the router R5 and the hierarchy is "/9/16" because the entry "66/9/16" is hit.

(d) The packet path controller 64 changes the hierarchized extension which is allotted to the packet P1 to "/9/16" and transmits the packet P1 to the router R5 via the packet transmitting/receiving means 1.

(5) Relay Operation in Router R5

By the same processing as the relay processing in the router R2, the packet P1 is transmitted to the router R6.

(6) Relay Operation in Router R6

(a) The relay packet processing means 6 of the router R6 receives the packet P1 via the packet transmitting/receiving means 1. The packet selector 61 determines that the packet P1 is addressed to the hierarchized network because the hierarchized extension is allotted to the packet P1 and transfers the packet P1 to the packet path controller 64.

(b) The packet path controller 64 determines that the destination host resides in the same network because the destination address value "66" of the hierarchy indicated by the hierarchized extension is the same as the address value "66" at the same hierarchy of the router R6 itself, and the network portion of bits lower than "66" is consistent with the network NW 221 (145.66.89.0/17/24) to the router R6 itself belongs and transfers the packet to the in-homonetwork packet transfer portion 67.

(c) The in-homonetwork packet transfer portion 67 delivers the packet P1 to the host H1 with a conventional transmitting means in the same network such as the ARP (address Resolution Protocol).

2.2 Packet Relay Operation to Non-hierarchized Network

In the network where the path information is exchanged as shown in FIG. 8, the packet transmission to the non-hierarchized network is also illustrated in FIG. 9. In this example, a packet P2 is transmitted and delayed from the router R1 to a host H2 (202.33.95.4). The hierarchized extension is not allotted to the packet addressed to the non-hierarchized network through all of the relay processing and each of the routers performs the path retrieval with the prior method by the path table retrieval portion 63 in the relay packet processing means 6.

It is to be noted that although this example shows the packet transmission from a router to a host, the packet transmission from any host or router as well as the packet reception at any host or router can be performed likewise.

As described above, an network path controlling method and an apparatus therefor according to the present invention is arranged such that each of routers exchanges hierarchy information of the highest hierarchy in hierarchized networks having the routers therebetween in the form of path information, a source host allots and transmits the hierarchy information to an IP address of the destination host, and a relaying router performs a path retrieval based on the hierarchy information. Therefore, the following effects are obtained.

① Each of the routers allots the hierarchy information which is used in the path retrieval to the packet as an hierarchized extension whereby it becomes possible for the router to perform the path retrieval focused on the hierarchy.

② It becomes possible to prepare a table for path retrieval for specified hierarchy by exchanging the path information with the hierarchized extension between the routers.

I claim:

1. A network path controlling method comprising the steps of;

performing a path retrieval based on path information exchanged between routers in order that networks which share IP addresses hierarchized by arbitrarily dividing the IP addresses by an arbitrary bit length from an upper bit can be mutually connected through an upper one of hierarchized networks of the hierarchized IP addresses, exchanging hierarchy information of the highest hierarchized network in the hierarchized networks having the routers therebetween in the form of the path information between the routers, allotting and transmitting the hierarchy information to an IP address of a destination host for a packet in a source host, and performing the path retrieval based on the hierarchy information in a relaying router.

2. The network path controlling method as claimed in claim 1 wherein each of the routers performs the path retrieval for a hierarchy lower than the hierarchy indicated by the hierarchy information allotted to the packet when a hierarchized IP address indicated by the hierarchy information allotted to the packet is the same as an IP address at the same hierarchy of the hierarchy information in its router, and otherwise performs the path retrieval only with the IP address of the hierarchy indicated by the hierarchy information allotted to the packet.

3. The network path controlling method as claimed in claim 1 wherein each of the routers performs the path retrieval for a path different from the path to the network having the hierarchy information when the hierarchy information is not allotted to the packet.

4. The network path controlling method as claimed in 1 wherein the routers are used as the hosts.

5. A network path controlling apparatus comprising;
a path table used to perform a path retrieval based on path information exchanged between routers in order that networks which share IP addresses hierarchized by arbitrarily dividing the IP addresses by an arbitrary bit length from an upper bit can be mutually connected through an upper one of hierarchized networks of the hierarchized IP addresses;
each of the routers exchanging hierarchy information of the highest hierarchized network in the hierarchized networks having the routers therebetween in the form of the path information, and holding the path information as a path table,
a source host allotting and transmitting the hierarchy information to the IP address of a destination host for a packet,
and a relaying router performing the retrieval by the path table based on the hierarchy information.

6. The network path controlling apparatus as claimed in claim 5 wherein each of the routers has another path table for performing a path retrieval for a path different from the path to the network having the hierarchy information when the hierarchy information is not allotted to the packet.

7. The network path controlling apparatus as claimed in claim 5 wherein each of the routers comprises a packet transmitting/receiving means for transmitting/receiving the packet, a path table holding means for holding the path information as the path table, a packet preparing means for preparing/transmitting the packet when the router becomes the source host according to a demand from an upper hierarchy, a path information receiving means for preparing or renewing the path table based on the path information received from an adjoining router, a path information transmitting means for transmitting the path information to the adjoining router and the destination host, and a relay packet processing means for relaying the packet received from the packet transmitting/receiving means; and the relay packet processing means performs a retrieval by the path table for a hierarchy lower than the hierarchy indicated by the hierarchy information allotted to the packet when a hierarchized IP address indicated by the hierarchy information allotted to the packet is the same as an IP address at the same hierarchy of the hierarchy information in its router, and otherwise performs a retrieval by the path table only with the IP address of the hierarchy indicated by the hierarchy information allotted to the packet.

8. The network path controlling apparatus as claimed in claim 7 wherein the packet transmitting/receiving means includes a packet receiver which allots the packet received from a transmitting line to the path information receiving means when the packet is the path information, and which otherwise allots the packet to the relay packet processing means, and a packet transmitter which transmits the packet transferred from the path information transmitting means or the relay packet processing means to the transmitting line.

9. The network path controlling apparatus as claimed in claim 7 wherein the path table holding means comprises a non-hierarchized network table portion which holds the path information to a non-hierarchized network, and a hierarchized network table portion which holds the path information to the hierarchized network.

10. The network path controlling apparatus as claimed in claim 7 wherein the packet preparing means comprises a packet preparing portion which prepares a packet which the host transmits, and a path retrieval portion which performs a path retrieval based on the path table holding means to the destination address instructed by the packet preparing portion.

11. The network path controlling apparatus as claimed in claim 9 wherein the path information receiving means includes a hierarchized network-path information extractor which classifies entries in the path information transferred from the packet transmitting/receiving means into ones of the hierarchized network and of non-hierarchized network based on the existence of a hierarchized extension and a non-hierarchized network table constructor which writes the entries in the path information addressed to the non-hierarchized network extracted by the hierarchized network-path information extractor in the non-hierarchized network table portion of the path table holding means.

12. The network path controlling apparatus as claimed in claim 9 wherein the path information transmitting means includes a timer portion which instructs the transmitting path information preparing portion of the destination for the path information at a fixed time interval, a hierarchy instructor which notifies the transmitting path information preparing portion of a hierarchy of an adjoining network which transmits the path information; and the transmitting path information preparing portion prepares the path information from the non-hierarchized network table portion or the hierarchized network table portion and transmits the same to the adjoining router or the host through the packet transmitting/receiving means.

13. The network path controlling apparatus as claimed in claim 9 wherein the relay packet processing means includes a packet selector addressed to hierarchized networks, a packet path controller addressed to the non-hierarchized network, a path table retrieval portion addressed to the non-hierarchized network, a packet path controller addressed to the hierarchized network, a path table retrieval portion for a specified hierarchy, a path table retrieval portion for an unspecified hierarchy, and a packet transferring portion in the same network; the packet selector determines whether or not the destination is the hierarchized network based on the existence of the hierarchized extension of the packet transferred from the packet transmitting/receiving means, transfers the packet to the packet path controller addressed to the hierarchized network when the destination is the hierarchized network, transfers the packet to the packet path controller addressed to the non-hierarchized network when the destination is the non-hierarchized network, determines that the destination host is in the network to which the router belongs when the hierarchized extension is allotted to the destination address and the destination IP address of the hierarchy indicated by the hierarchized extension is the same value as the address of the same hierarchy of a router which performs a relay processing, and when bits lower than the hierarchized extension in a network portion of the destination IP address are the same as the IP address of the network to which the router belongs, and delivers the packet to the destination host through the packet transferring portion in the same network; the packet path controller addressed to the non-hierarchized network instructs the path table retrieval portion addressed to the non-hierarchized network of the retrieval of the path table for the network portion of the destination address at the packet and transmits the packet to a router recognized as performing a next relay processing from the retrieval result through the packet transmitting/receiving means; the path table retrieval portion addressed to the non-hierarchized network retrieves the router to be transmitted next from the whole of the network portion of the destination address at the packet from the non-hierarchized network table portion of the path table holding means and notifies the packet path controller addressed to the non-hierarchized network of the retrieval result; the packet path controller addressed to the hierarchized network determines that the packet has not yet reached the network of the hierarchy indicated by the hierarchized extension to instruct the specified hierarchy packet path table retrieval portion of the path retrieval, and to perform the transmission processing based on the retrieval result when the hierarchized extension is allotted to the destination address and the destination address at the hierarchy indicated by the hierarchized extension is different from the address at the same hierarchy of a router which performs a relay processing, and otherwise determines that the packet has reached the network of the hierarchy indicated by the hierarchized extension to instruct the unspecified hierarchy path table retrieval portion to perform the path retrieval about the bits lower than the hierarchized extension in the network portion of the destination IP address, and to resultantly perform the transmission processing after rewriting the hierarchy information notified from the unspecified hierarchy path table retrieval portion to a new hierarchized extension; the specified hierarchy path table retrieval portion performs the retrieval of the path table only about an area indicated by the hierarchized extension among the destination IP address with respect to the hierarchized network table portion of the path table holding means based on the instructions of the packet path controller addressed to the hierarchized network, and notifies the packet path controller addressed to the hierarchized network of the retrieval result; the unspecified hierarchy path table retrieval portion performs the retrieval of the path table about the bits lower than the hierarchized extension in the network portion of the destination IP address with respect to the hierarchized network table portion of the path table holding means based on the instructions of the packet path controller addressed to the hierarchized network, and notifies the packet path controller addressed to the hierarchized network of the retrieval result; and the packet transferring portion in the same network transfers the packet to the host which exists in the same network as the router.

* * * * *